(12) United States Patent
Hofer

(10) Patent No.: US 11,719,238 B2
(45) Date of Patent: Aug. 8, 2023

(54) LIQUID INTAKE FILTERS

(71) Applicant: Cameron Farms Hutterite Colony, Turin (CA)

(72) Inventor: Joseph Hofer, Turin (CA)

(73) Assignee: Cameron Farms Hutterite Colony, Turin (CA)

( * ) Notice: Subject to any disclaimer, the term of this patent is extended or adjusted under 35 U.S.C. 154(b) by 0 days.

(21) Appl. No.: 17/855,449

(22) Filed: Jun. 30, 2022

(65) Prior Publication Data

US 2022/0333595 A1 Oct. 20, 2022

Related U.S. Application Data

(63) Continuation of application No. 16/845,265, filed on Apr. 10, 2020, now Pat. No. 11,428,219.

(Continued)

(51) Int. Cl.

| F04B 53/20 | (2006.01) |
|---|---|
| F04B 53/10 | (2006.01) |
| B01D 33/073 | (2006.01) |
| B01D 33/80 | (2006.01) |
| B01D 29/33 | (2006.01) |
| B01D 35/26 | (2006.01) |
| B01D 33/50 | (2006.01) |
| B01D 33/067 | (2006.01) |
| B01D 33/46 | (2006.01) |

(52) U.S. Cl.
CPC ............. *F04B 53/20* (2013.01); *B01D 29/33* (2013.01); *B01D 33/073* (2013.01); *B01D 33/801* (2013.01); *B01D 35/26* (2013.01); *F04B 53/10* (2013.01); *B01D 33/067* (2013.01); *B01D 33/463* (2013.01); *B01D 33/50* (2013.01); *F05B 2240/93* (2013.01); *F05B 2240/98* (2013.01); *F05B 2260/63* (2013.01)

(58) Field of Classification Search
None
See application file for complete search history.

(56) References Cited

U.S. PATENT DOCUMENTS

| 374,952 A | * | 12/1887 | Falcon ................. | B01D 33/073 |
| | | | | 210/393 |
| 682,994 A | * | 9/1901 | Parsons ................ | B01D 33/503 |
| | | | | 210/161 |

(Continued)

FOREIGN PATENT DOCUMENTS

WO WO-2020206556 A1 * 10/2020 ........... B01D 29/114

*Primary Examiner* — Robert J Popovics
(74) *Attorney, Agent, or Firm* — Holzer Patel Drennan

(57) ABSTRACT

Apparatus and methodologies are provided for pumping fluids from a body of fluids. Herein, an apparatus operably connected to at least one pump for pumping fluids from a body of fluids is provided, the apparatus having a pump hose with a first intake end for receiving the pumped fluids and a second outlet end operably connected to the pump, a pump intake assembly, fluidically connected to the intake end of the pump hose, the pump intake assembly having at least one fluid control valve, a rotatable filter cage, centrally disposed about the pump intake assembly, and at least one fluid injection pipe centrally disposed within the pump hose for supporting the at least one fluid control valve, and for injecting fluids to drive the rotation of the rotatable filter cage. Herein, methods of utilizing the fluid pumping apparatus are provided.

9 Claims, 16 Drawing Sheets

Related U.S. Application Data

(60) Provisional application No. 62/833,278, filed on Apr. 12, 2019.

(56) References Cited

U.S. PATENT DOCUMENTS

| | | | | |
|---|---|---|---|---|
| 788,511 A * | 5/1905 | Besseberg | ............ | B01D 33/073 415/121.2 |
| 914,758 A * | 3/1909 | Schumann | ............ | B01D 33/04 210/161 |
| 969,364 A * | 9/1910 | Grootenhuis | .......... | B01D 33/70 210/354 |
| 1,109,385 A * | 9/1914 | Allison | ...................... | E03F 5/14 210/155 |
| 1,210,759 A * | 1/1917 | Breddin | .................. | E02B 1/006 210/156 |
| 1,513,878 A * | 11/1924 | Anthony | ................ | B01D 33/06 210/160 |
| 1,516,693 A * | 11/1924 | Anthony | ................ | B01D 35/05 210/385 |
| 1,726,608 A * | 9/1929 | Brackett | ............. | B01D 33/466 210/161 |
| 1,810,981 A * | 6/1931 | Noble | .................... | B01D 29/11 405/127 |
| 2,126,575 A * | 8/1938 | Ranney | ...................... | E03B 3/11 166/158 |
| 2,223,104 A * | 11/1940 | Hansen | ................ | B01D 33/801 210/354 |
| 3,193,103 A * | 7/1965 | Snyder | .................. | B01D 29/33 210/411 |
| 3,242,872 A * | 3/1966 | Thompson | ............ | F04D 29/708 417/313 |
| 3,627,130 A * | 12/1971 | Talley, Jr | ............... | B01D 33/72 210/781 |
| 3,737,038 A * | 6/1973 | Westfall | ................ | B01D 35/28 210/781 |
| 3,843,520 A * | 10/1974 | Bottorf | ................. | B01D 35/05 210/393 |
| 3,996,138 A * | 12/1976 | Daidola | ................. | E02B 1/006 210/170.11 |
| 4,017,394 A * | 4/1977 | Hensley | ............... | B01D 33/801 210/242.1 |
| 4,169,792 A * | 10/1979 | Dovel | .................... | B01D 33/50 210/411 |
| 4,192,749 A * | 3/1980 | Jackson | ............... | B01D 33/073 210/161 |
| 4,210,539 A * | 7/1980 | Shiban | ................. | B01D 33/073 210/402 |
| 4,261,822 A * | 4/1981 | Richardson | .......... | B01D 33/801 210/161 |
| 4,343,698 A * | 8/1982 | Jackson | ............... | B01D 35/06 210/161 |
| 4,822,486 A * | 4/1989 | Wilkins | ............... | B01D 33/073 210/393 |
| D327,693 S * | 7/1992 | Berry | .......................... | D15/141 |
| 5,192,429 A * | 3/1993 | Bader | .................... | B01D 29/15 210/411 |
| 5,653,874 A * | 8/1997 | Berry, III | ................ | E02B 1/006 210/162 |
| 6,270,669 B1 * | 8/2001 | Bauer | .................... | B01D 35/05 210/402 |
| 6,451,204 B1 * | 9/2002 | Anderson | ............... | E02B 5/085 210/162 |
| 6,500,331 B2 * | 12/2002 | Massignani | ............ | B01D 33/39 210/330 |
| 6,790,345 B2 * | 9/2004 | Broussard | ............ | B01D 24/008 210/243 |
| 7,347,933 B2 * | 3/2008 | Berry, III | ............. | B01D 33/073 210/791 |
| 7,648,630 B2 * | 1/2010 | Broussard | ............... | C02F 1/001 210/275 |
| 7,670,482 B2 * | 3/2010 | Wietham | ............... | F04D 29/708 210/402 |
| 8,652,324 B2 * | 2/2014 | Wietham | ............... | B01D 33/801 210/402 |
| 9,023,198 B2 * | 5/2015 | Wietham | ............... | B01D 35/05 210/402 |
| 9,403,108 B2 * | 8/2016 | Broussard | ............ | B01D 29/68 |
| 9,968,872 B2 * | 5/2018 | Carayon | ............. | B01D 33/073 |
| 10,391,429 B2 * | 8/2019 | Carayon | ............. | B01D 33/503 |
| 10,549,224 B2 * | 2/2020 | Carayon | ............. | B01D 33/503 |
| 10,737,950 B2 * | 8/2020 | Bennett | ...................... | C02F 1/004 |
| 11,428,219 B2 * | 8/2022 | Hofer | ...................... | F04B 53/20 |
| 11,584,661 B2 * | 2/2023 | Liberman | ............... | A01K 79/02 |
| 2003/0010691 A1 * | 1/2003 | Broussard | ............ | B01D 24/08 210/243 |
| 2005/0126967 A1 * | 6/2005 | Berry, III | ............. | B01D 33/461 210/396 |
| 2007/0090041 A1 * | 4/2007 | Berry, III | ............. | B01D 33/461 210/402 |
| 2007/0227956 A1 * | 10/2007 | Wietham | ............... | B01D 33/50 210/403 |
| 2009/0230042 A1 * | 9/2009 | Broussard | ............... | C02F 1/004 210/275 |
| 2011/0233132 A1 * | 9/2011 | Wietharn | ............... | B01D 33/801 210/403 |
| 2011/0297595 A1 * | 12/2011 | Wallace | .................. | E02B 1/006 210/155 |
| 2012/0125829 A1 * | 5/2012 | Wallace | .................... | E02B 9/04 210/170.11 |
| 2012/0248018 A1 * | 10/2012 | Hopf | .................. | B01D 29/6423 210/159 |
| 2013/0180904 A1 * | 7/2013 | Broussard | ............... | C02F 1/004 210/232 |
| 2014/0138300 A1 * | 5/2014 | Wietham | ............... | B01D 33/073 210/242.1 |
| 2015/0258474 A1 * | 9/2015 | Broussard | ............ | B01D 35/05 210/257.1 |
| 2015/0265952 A1 * | 9/2015 | Berry, IV | ............. | B01D 33/461 210/396 |
| 2016/0114265 A1 * | 4/2016 | Liberman | .......... | B01D 24/4689 210/275 |
| 2019/0062178 A1 * | 2/2019 | Bennett | ................ | B01D 29/902 |
| 2019/0263677 A1 * | 8/2019 | Liberman | ............. | B01D 24/12 |
| 2020/0325894 A1 * | 10/2020 | Hofer | .................... | F04B 53/103 |
| 2021/0002146 A1 * | 1/2021 | Liberman | ............... | C02F 1/004 |
| 2022/0333595 A1 * | 10/2022 | Hofer | .................. | B01D 29/114 |

\* cited by examiner

LIQUID INTAKE FILTERS

CROSS REFERENCE TO RELATED APPLICATION

This application is a continuation of U.S. application Ser. No. 16/845,265, entitled "FLUID PUMPING APPARATUS AND METHODS OF USE", filed on Apr. 10, 2020, which claims priority from U.S. Ser. No. 62/833,278, entitled "WATER SKIMMER", and filed on Apr. 12, 2019, the entire contents of which are incorporated by reference herein as if set forth in full.

TECHNICAL FIELD

Embodiments herein are related to apparatus and methodologies for pumping fluids from a body of fluids using an improved fluid pumping apparatus. More specifically, the present apparatus and methodologies are directed to a horizontally rotatable fluid pumping apparatus operative to pump fluids from a body of fluids, while simultaneously filtering debris therefrom.

BACKGROUND

Irrigation pumps are commonly used in the agriculture industry to pump water from lower to higher ground from which the water can then be used to irrigate target areas. In some cases, irrigation pumps are also used to reduce waterlogging or pooling in low lying fields.

Many different types of pumping systems are known and can be selected based upon various factors including the performance requirements or the body of water being drawn upon. For example, the type of pumping system used to draw from a river or a lake may differ depending upon water currents and/or the depth of the water, particularly where it is undesirable to disrupt sand or silt at the bottom of the river or lake. The pumping system may also need to operate in a body of water contaminated with undesirable matter such as leaves, branches, or other debris.

As such, there is a need for an improved fluid pumping system for use in pumping water from rivers, lakes, or other bodies of water (including low-lying bodies of water). It is desirable that such a pumping system may be a simple, mobile unit that can easily be installed and adapted to various drainage locations regardless of varying fluid currents and/or fluid depth.

SUMMARY

According to embodiments, an improved fluid pumping apparatus is provided, the apparatus operably connected to at least one pump for pumping fluids from a body of fluids, the apparatus comprising a pump hose having a first intake end for receiving the pumped fluids and a second outlet end operably connected to the pump, a pump intake assembly, fluidically connected to the intake end of the pump hose, the pump intake assembly having at least one fluid control valve, a rotatable filter cage, centrally disposed about the pump intake assembly, and at least one fluid injection pipe centrally disposed within the pump hose for supporting the at least one fluid control valve, and for injecting fluids to clean the rotatable filter cage.

According to other embodiments, methods for pumping fluids from a body of fluids are provided, the methods comprising providing a fluid pumping apparatus operably connected, via a pump hose, to at least one pump for pumping the fluids, the fluid pumping apparatus having a horizontally rotating filter cage centrally disposed about the pump hose, positioning the at least one fluid pumping apparatus at or near the surface of the body of fluids, pumping fluids into the fluid pumping apparatus via the horizontally rotating filter cage and into the pump hose, and simultaneously injecting fluids via at least one fluid injection pipe to clean debris collecting about the rotating filter cage.

Reference will now be made to the following drawings, which assist in illustrating the various pertinent features of the various novel aspects of the present disclosure.

DESCRIPTION OF THE EMBODIMENTS

According to embodiments, an improved fluid pumping apparatus is provided, the apparatus operative to pump and/or drain fluids from a body of fluids. The presently improved apparatus may be operably connected to at least one pump at or near the surface of the body of fluids for pumping the fluids. Advantageously, the present apparatus is configured to comprise a horizontally-rotatable housing (i.e.

parallel with the surface of the fluids), providing a self-cleaning apparatus that can be utilized in shallow bodies of water (i.e. depths as small as 4 inches). Moreover, the present apparatus is configured to float on the surface of the body of fluids, providing an apparatus that can be used to pump fluids even where fluid flow/currents are present or where the depth of the fluids varies (e.g. due to waves).

More specifically, the present apparatus is specifically configured to enable the horizontal, rotatable housing to rotate about its axis due, at least in part, to fluids flowing through the housing. The housing may be centrally-disposed about the non-rotating suctioning means, i.e. a pump hose connected to the at least one pump. The apparatus is also specifically configured to provide at least one fluid control means (e.g. check valve(s)) for controlling fluid flowing into the pump hose, and for preventing the pumped fluids from inadvertently returning back into the fluid body (i.e. preventing fluid backflow). The apparatus is also specifically configured to provide an adapted fluid intake assembly for enhancing the intake of fluids drawn into the apparatus. Embodiments of the presently improved fluid pumping apparatus and methods of use will now be described having regard to FIG. 1-16.

Figure 1:
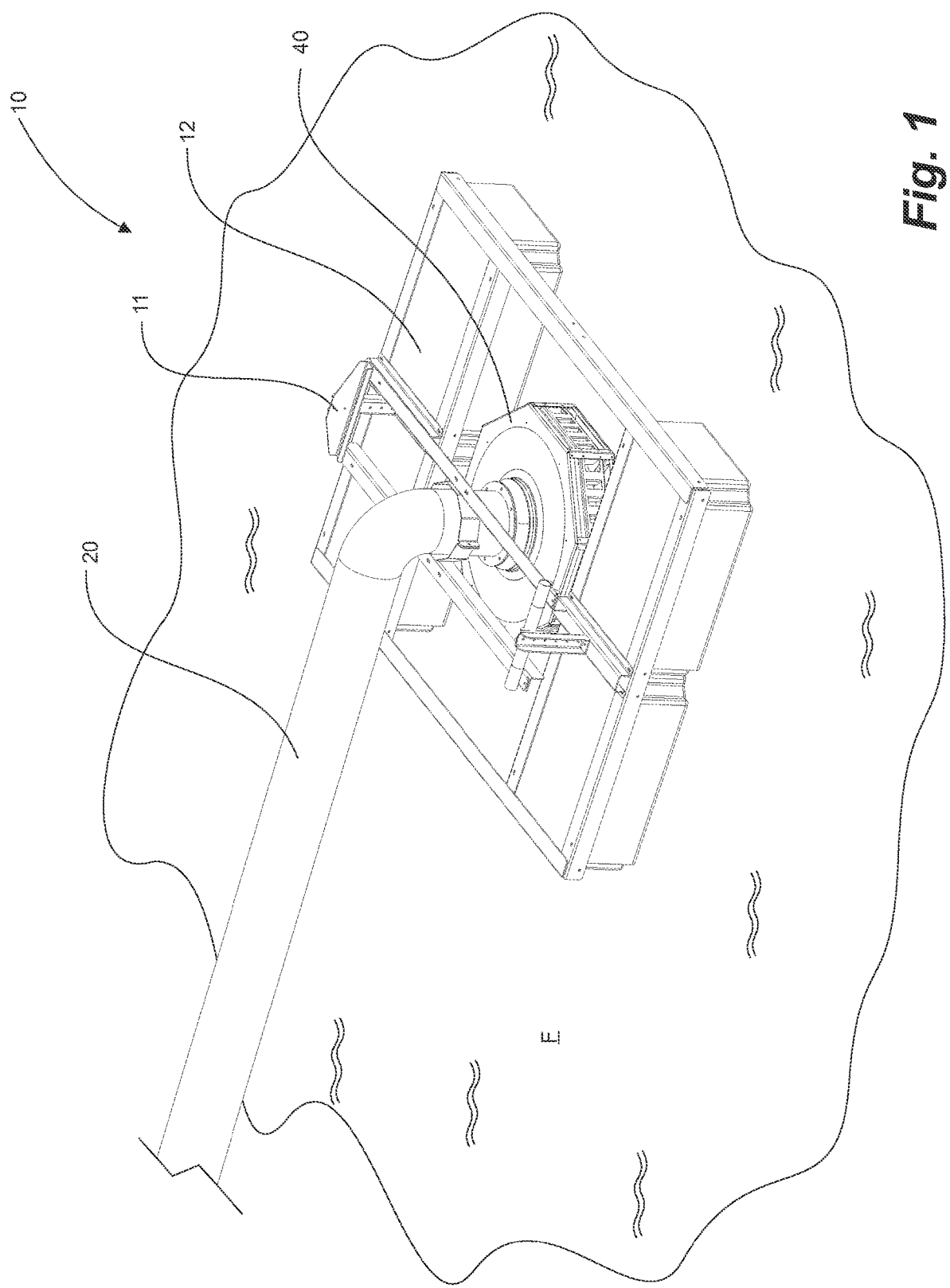
FIG. 1 is a perspective top view of the present apparatus, according to embodiments.
Figure 2:
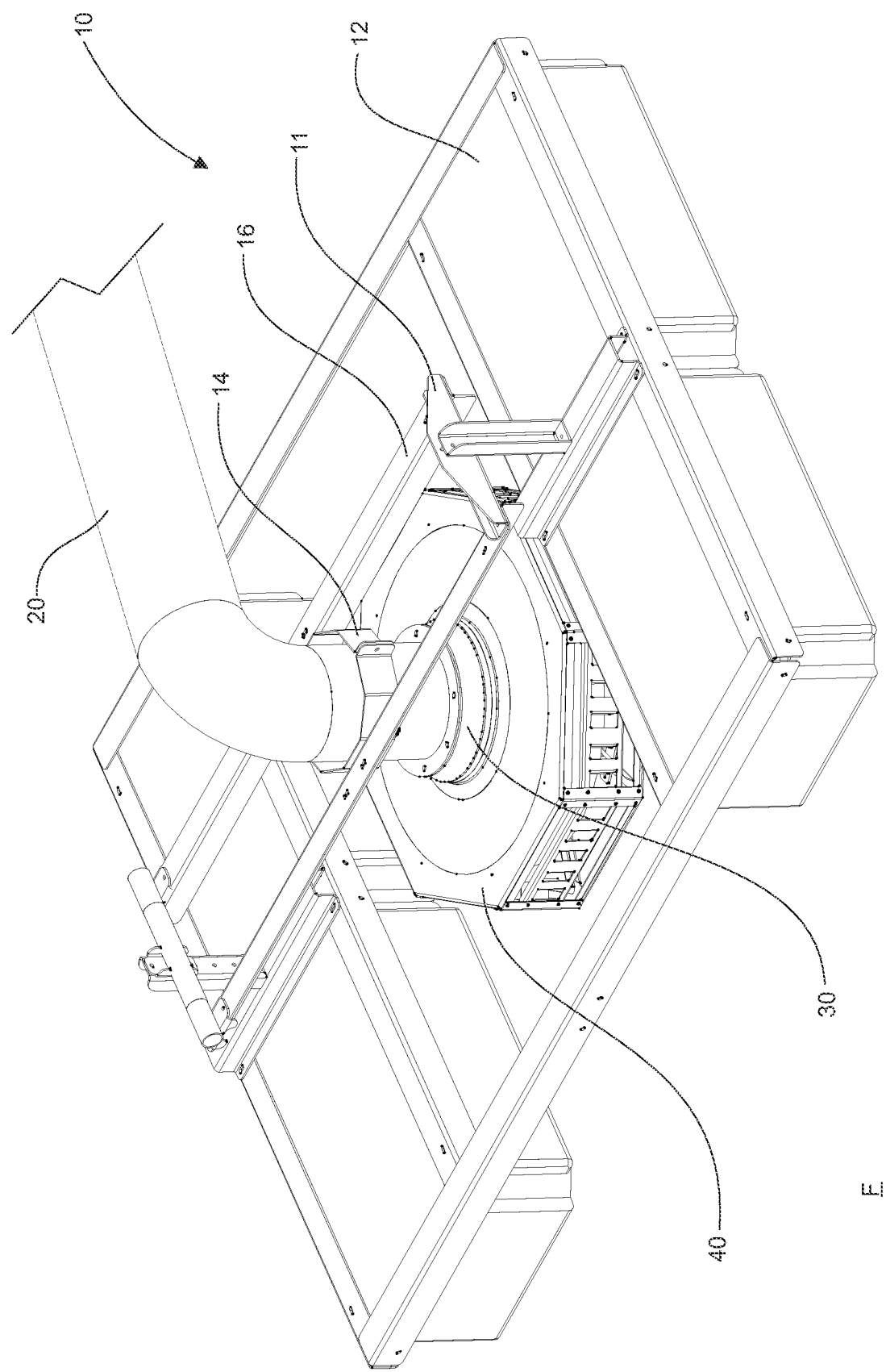
FIG. 2 is a zoomed in perspective top view of the present apparatus, according to embodiments.

Broadly, according to embodiments and having regard to FIGS. 1 and 2, an improved fluid pumping apparatus 10 is illustrated, the apparatus positioned so as to float on the surface of the body of fluids (F) being drained. Generally, the basic components of the present pumping apparatus 10 are a pump (not shown) positioned at or near the surface of the fluids being pumped, e.g. on land near the body of fluids (F), the pump being connected to pump hose 20 for drawing the pumped fluids from the body of fluids (F), and a rotatable housing, or filter cage 40, centrally disposed about the pump hose 20 for filtering debris from the body of fluids (F). Pump hose 20 further comprises a pump intake assembly 30 comprising an inlet 32 specifically configured to draw fluids from the body of fluids, and at least one fluid control valve 34 for controlling fluids (F) pumped into the pump hose 20 and for preventing the backflow of fluids (F) therefrom. The present apparatus 10 further comprises a fluid injection pipe 50, concentrically positioned within pump hose 20, for injecting fluids towards the filter cage 40 for driving rotation and cleaning filter cage 40, and for supporting check valve 34 and propeller (as will be described).

More specifically, the present apparatus 10 may be supported by one or more flotation devices 12, such as buoys, advantageously enabling the apparatus 10 to float at or near the surface of the body of fluid (F). In some embodiments, the one or more flotation devices 12 may be adjustably connected to the apparatus 10 so as to control the position of apparatus 10 on or within the surface of the fluids (F). For example, the floatation devices 12 may be adjustably connected to the apparatus 10 such that the depth of the pump intake assembly 30 may be maintained at a desired depth within the fluids (F) to optimize pumping thereof, particularly as the fluid level changes over time.

In some embodiments, the flotation devices 12 may be releasably secured to the apparatus 10 via one or more height-adjustment devices 11 for raising and lowering the height of the pump intake assembly 30 relative to the surface of the fluids (F). Height-adjustment devices 11 may comprise one or more connectors 14, such as an annular connector encircling the pump hose 20, releasably secured to at least one horizontal cross-bar(s) 16, which are in turn adjustably secured to height-adjustment devices 11, such that adjusting height-adjustment devices 11 upwards or downwards correspondingly raises or lowers the entire apparatus 10, or a portion thereof, as desired. In this regard, advantageously, some or all of the apparatus 10 may be adaptably elevated above or submerged within the fluids (F), that is—the present pumping system 10 may be completely, substantially, or only partially submerged in the fluids (F).

Although example height-adjustment devices are shown, it is contemplated that any appropriate means for raising or lowering the apparatus 10 relative to the fluids (F) being pumped may be used. Moreover, although one or more buoy-type floatation devices 12 are shown, it should be understood that any floatation supports or devices for providing buoyancy to the apparatus 10 may be used. For example, where desired, the floatation devices 12 may be inflatable such that they may be compressed for ease of transportation and then inflated during installation on site. The floatation devices 12 may also be configured to provide additional structural support to the apparatus 10 such as where the body of fluids (F) may comprise significant turbulence (waves) or currents.

Figure 3:
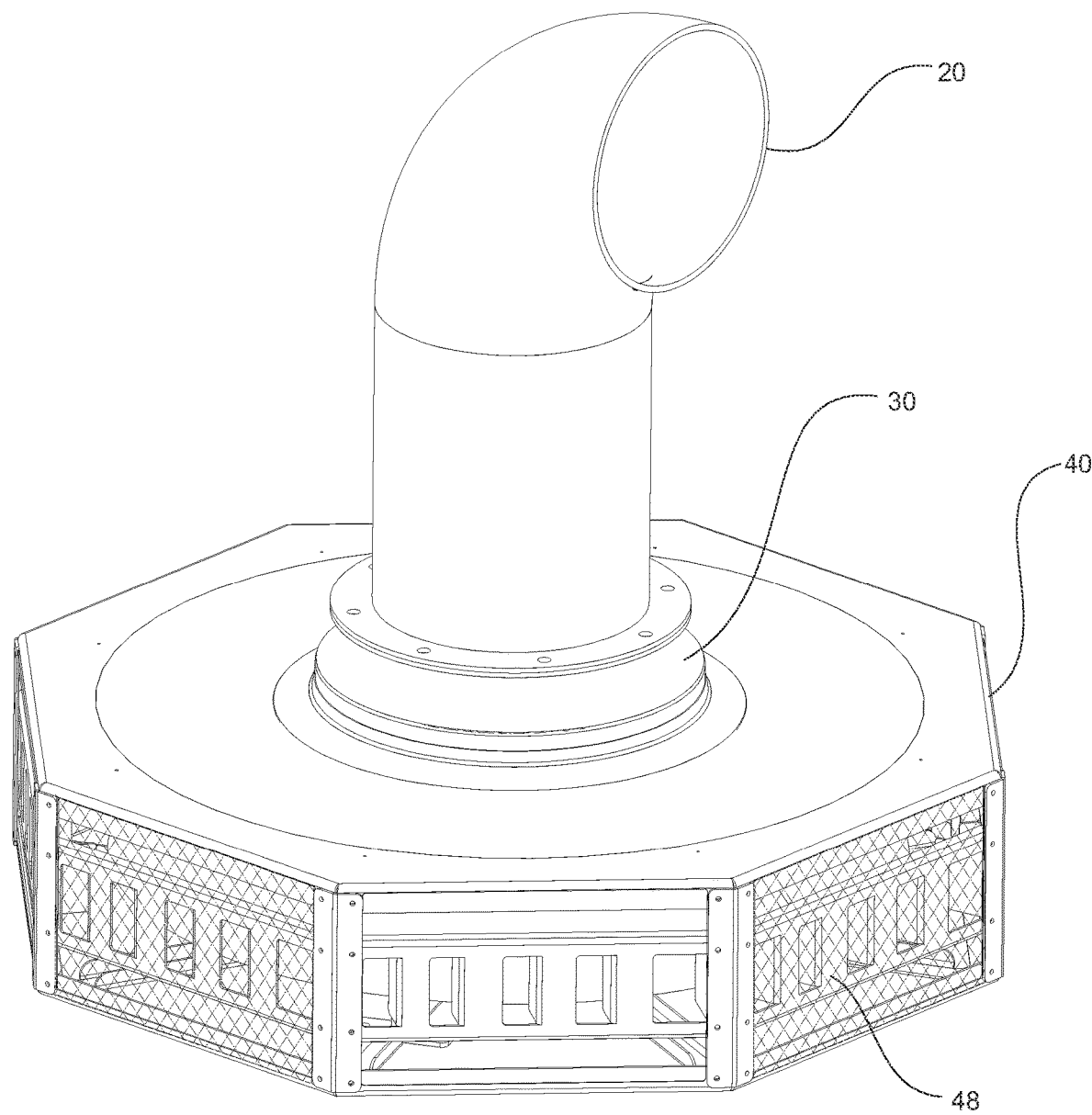
FIG. 3 is a perspective zoomed in side view of the pump intake assembly and the filter cage in isolation, according to embodiments.

Having regard to FIG. 3, the present pump intake assembly 30 may be centrally disposed and connected to a first, intake end of pump hose 20, a second, outlet end of the pump hose 20 being operatively connected to a pump (not shown). Details of the pump are not shown as the pump may be of any conventional variety. For example, as would be appreciated, the pump may be operably connected to, and driven by, a motor (not shown), and may further comprise an outlet or discharge portion for disposal of the pumped fluids (F) from the apparatus 10 (i.e. to a storage tank, for use, to application means for irrigating a target area, or for disposal, as applicable).

According to embodiments, pump intake assembly 30 may be specifically configured to efficiently and effectively draw fluids from the body of fluids (F), via pump hose 20. In some embodiments, pump intake assembly 30 may be fluidically connected with a fluid passageway 31 of pump hose 20 such that fluids drawn from the body of fluids (F) are pumped through the pump intake assembly and into the pump hose 20 to the surface. As would be appreciated, the present pump intake assembly 30 may be specifically configured to address known issues with suction pump design such as, without limitation, insufficient fluid pressure leading to cavitation within the pump, narrow pipes and constrictions producing noise, turbulence and friction losses, air or vapour entrainment, and suspended solids resulting in increased erosion of the fluid body floor (e.g. sand and silt), and the like. It is an object of the present invention that the present pump intake assembly 30 be specifically configured such that fluids (F) may be drawn from shallow bodies of fluids (e.g. less that 4 inches of fluids), decreasing the rate of fluid flow (e.g. velocity) and preventing turbulence or disruption of contaminants in the fluids.

The pump intake assembly 30 may comprise an adapted inlet end for controllably enhancing the flow of fluids pumped into the pump hose 20. For example, the adapted inlet end may be configured to be at least larger than fluid flow passageway 31 of pump hose 20 leading to the pump, so as to pass fluids in a surge-free, smooth and having laminar flow (i.e. increasing system efficiencies by reducing turbulence). It should be understood that while the presently adapted inlet is shown as a conical inlet 32 (as will be described), any configuration of inlet appropriate to achieve the desired result is contemplated. It should be appreciated that the present system may comprise additional componentry for enhancing fluid flow, such as reducers, inline flow conditions, or straighteners, as would be known in the art.

Figure 4:
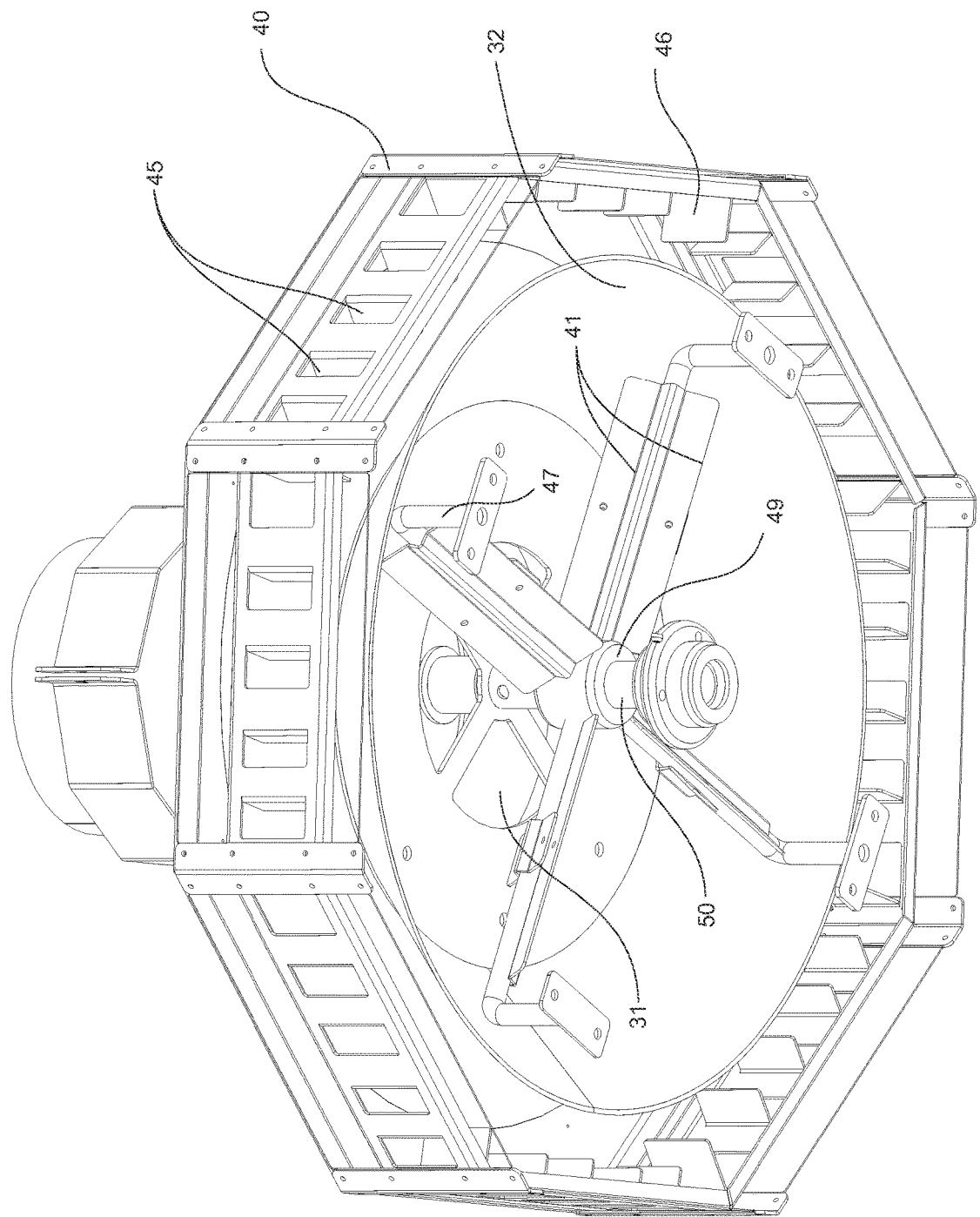
FIG. 4 is a perspective bottom view of the present apparatus, according to embodiments.

Having regard to FIG. 4, in some embodiments, the pump intake assembly 30 may comprise a conical inlet 32 or an inverted funnel shape having a larger funnel mouth than the stem, thereby slowing the flow of fluids flowing into the apparatus 10 and through fluid passageway 31 into pump hose 20. In some embodiments, pump hose 20 may comprise an internal diameter of 8 inches (e.g. pump hose 20 may comprise an 8 inch pipe), while the mouth of the conical inlet may comprise an internal diameter of up to 30 inches, and may preferably be between 20-30 inches. Herein, it should be understood that, for example, 1,000 gallons of fluid flowing directly into an 8 inch pipe may flow at a rate of approximately 30 ft/s, whereas 1,000 gallons of fluid flowing through the presently adapted conical inlet 32 may be slowed to a rate of approximately 0.5 ft/s. Accordingly, it is contemplated that the present apparatus 10 may be configured to reliably pump substantial amounts of fluids (F), such as at least 3,000 gallons/min of fluids, without significantly disrupting the body of fluids (F) being pumped. Advantageously, the foregoing enables the present apparatus 10 to be used in extremely shallow bodies of fluids (F).

At its upper (stem) end, adapted inlet 32 may comprise at least one fluid flow control device, such as a fluid control valve 34 for controlling the flow of fluids through inlet 32 into passageway 31. Valve 34 may be sized and shaped so as to sealingly close inlet 32, preventing fluids from passing therethrough. In some embodiments, valve 34 may comprise an annular check valve 34 movable between a first open position, where fluids can pass through inlet 32 into passageway 31 of pump hose 20, and a second closed position, where fluids are prevented from passing through inlet 32 (and preventing backward flow of fluids). In some embodiments, valve 34 may comprise an automatic control valve that actuates between open and closed positions in response to pressure or flow of fluids (F), thereby not requiring an external power source. For example, where fluid pressures from fluids (F) being drawn into the apparatus 10 is greater below the valve 34, the valve 34 will actuate upwardly, opening fluid flow passageway 31. Where fluid pressure is greater above the valve 34, the valve will actuate downwardly, sealingly engaging with inlet 32 to close fluid flow passageway 31.

Figure 5:
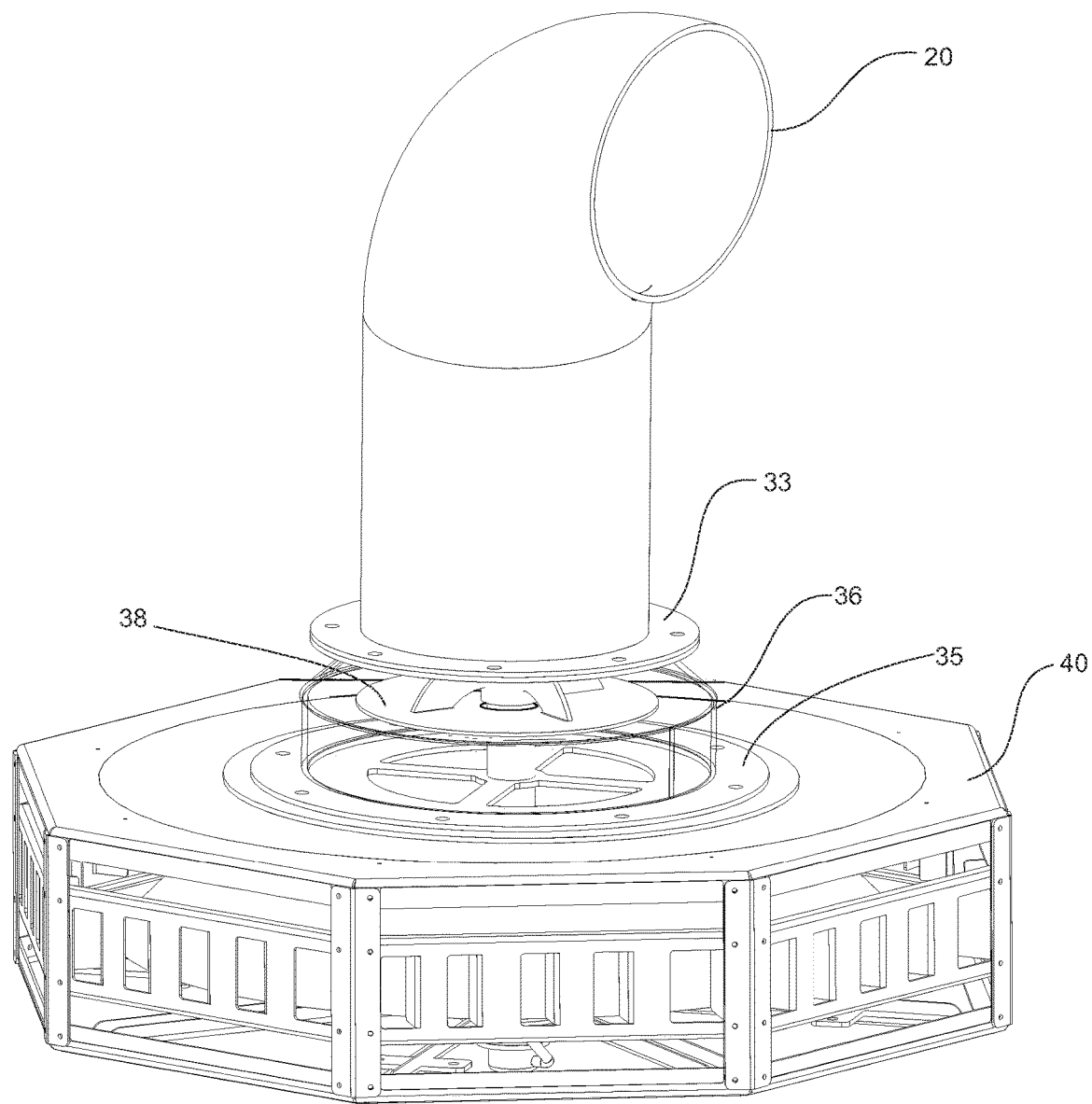
FIG. 5 is a zoomed in side view of the present apparatus showing an isolated view of the check valve in the open position, according to embodiments (fluid injection pipe not shown)
Figure 6:
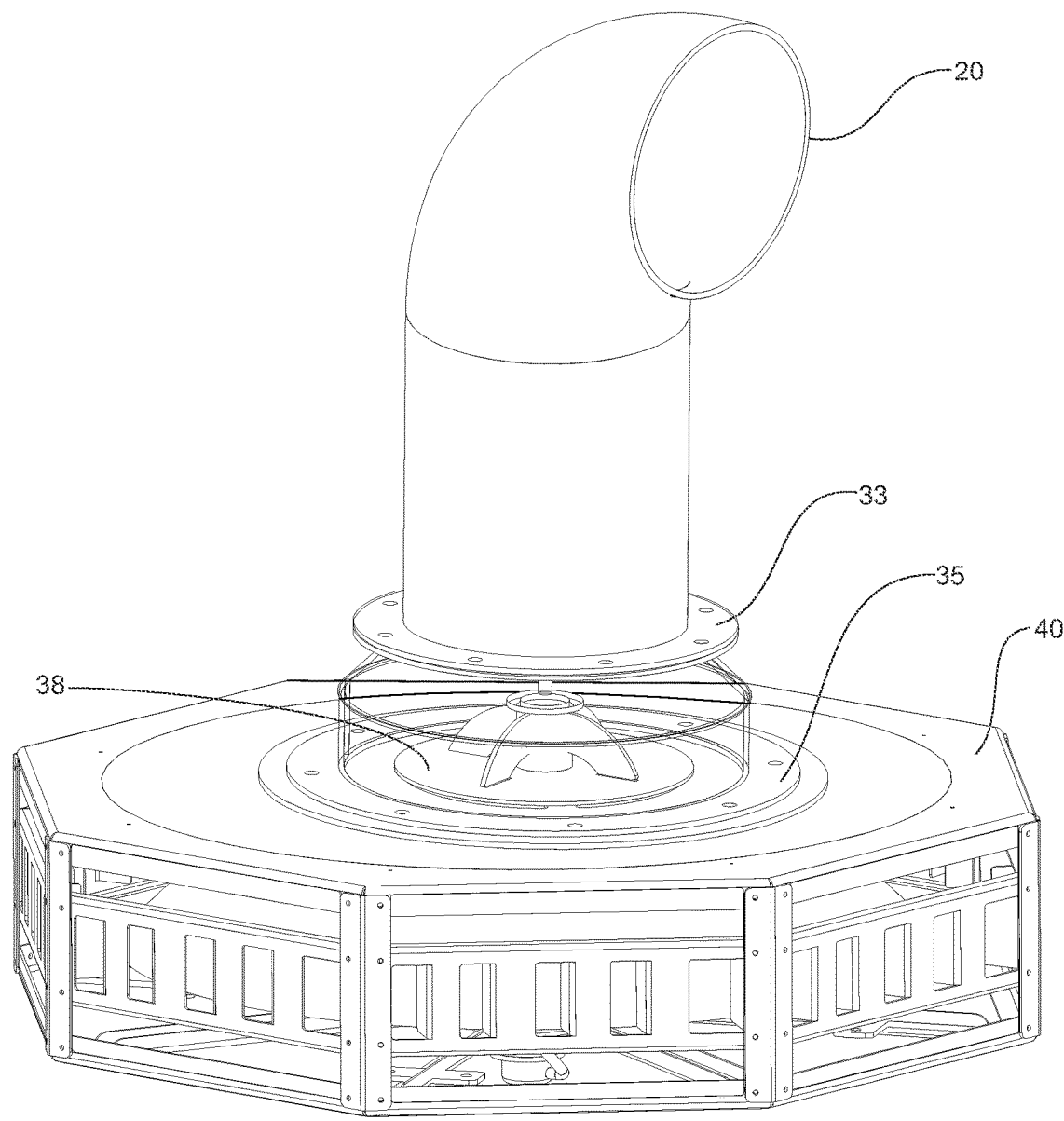
FIG. 6 is a zoomed in side view of the present apparatus showing an isolated view of the check valve in the closed position, according to embodiments (fluid injection pipe not shown)

Having regard to FIGS. 5 and 6, valve 34 may comprise a cylindrical valve body 36 consisting of top ring plate 33 and bottom ring plate 35, the top plate 33 being secured to the pump hose 20 and the bottom plate 35 being secured to filter cage 40. It should be understood that top and bottom plates 33,35 may be manufactured as separate components that are securely affixed, e.g. welded or bolted, to apparatus 10, or they may be manufactured to be integral to the apparatus 10. For example, in some embodiments, top and bottom plates 33,35, may each form a plurality of bolt holes H for securely connecting valve body 36 to apparatus 10 (FIG. 7), although any appropriate connections means known in the art may be used. Annular valve disc 38 may be positioned in between top and bottom plates 33,35, and may provide centrally disposed aperture 37 for slidingly receiving injection pipe 50 (as will be described below).

Figure 7:
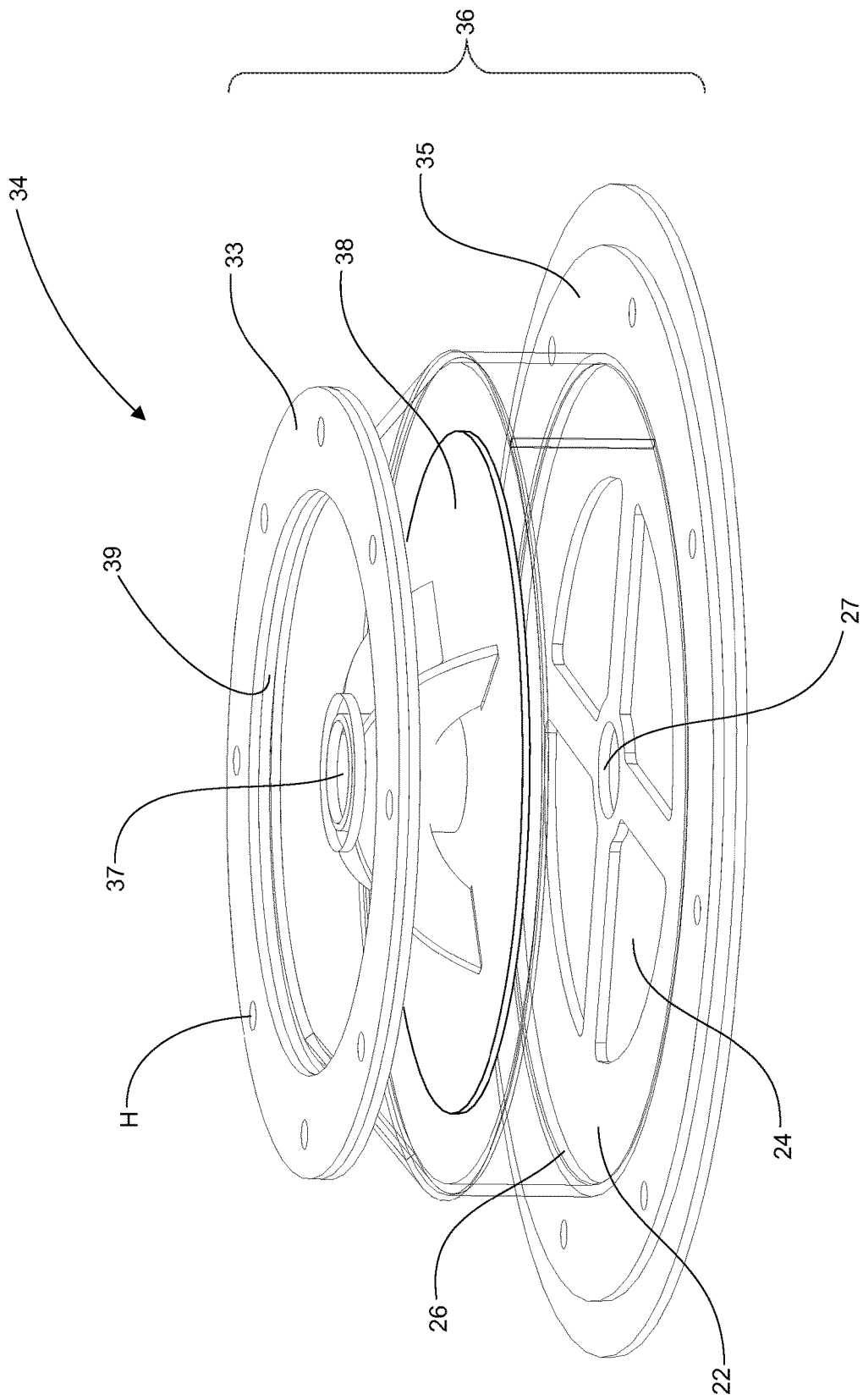
FIG. 7 is a zoomed in perspective view of the check valve in isolation, the valve being shown in the open position.
Figure 8:
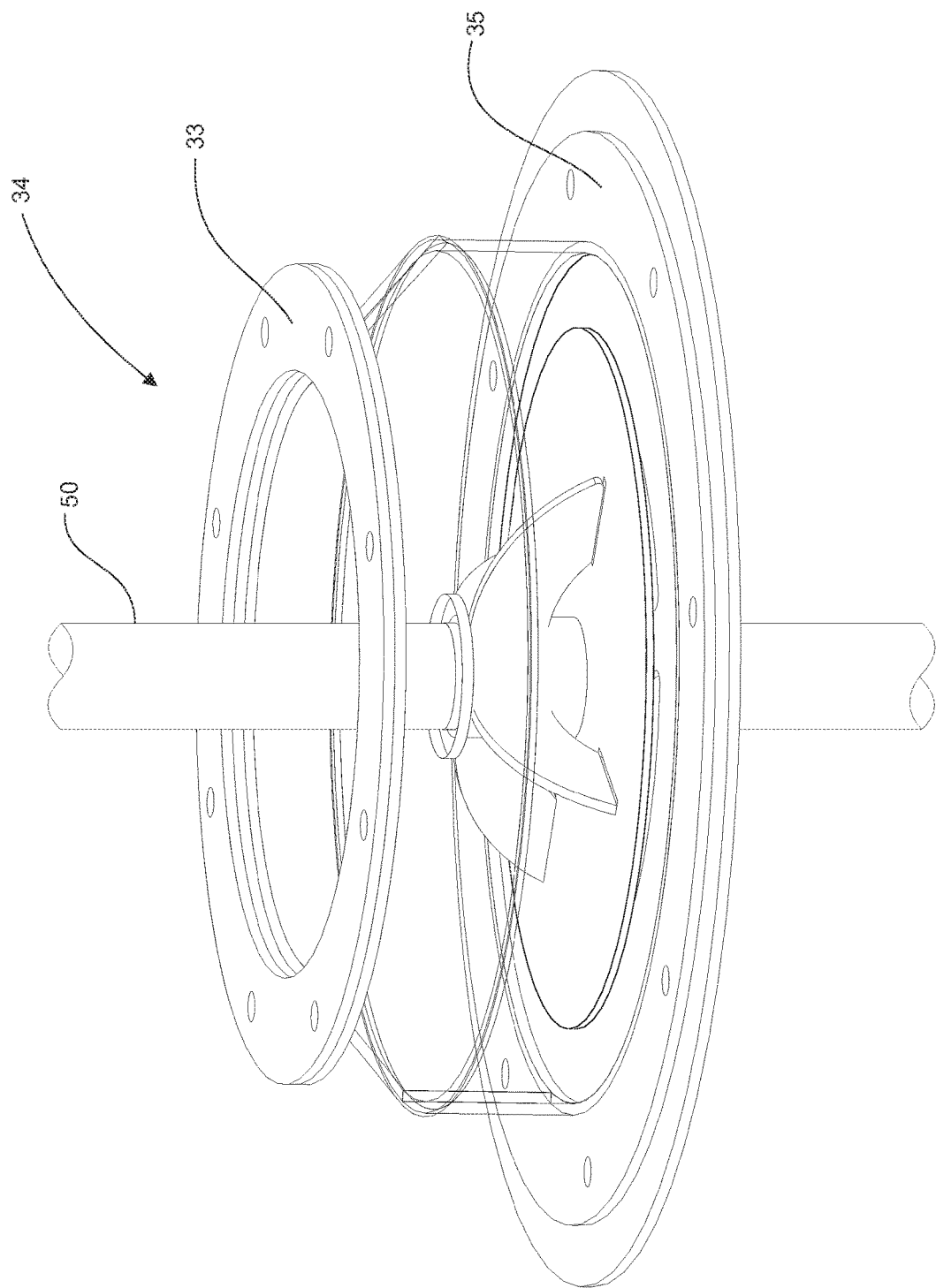
FIG. 8 is a zoomed in perspective view of the check valve in isolation, the valve being shown in the closed position (and showing supporting fluid injection pipe)
Figure 9:
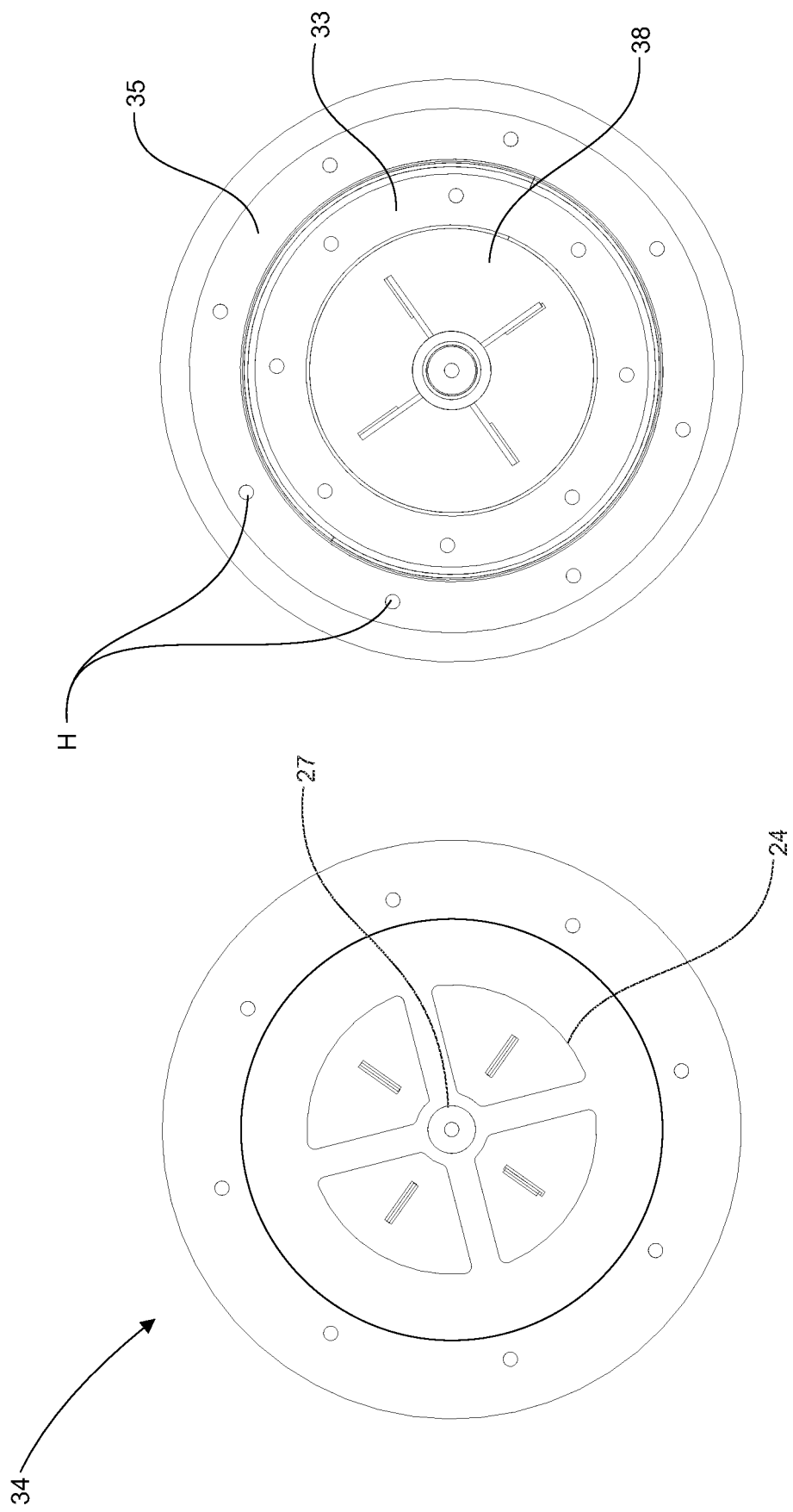
FIG. 9A shows a bottom view of the check valve in the closed position.
FIG. 9B shows a top view of the check valve in the closed position.

Having regard to FIGS. 7 and 8, herein, advantageously, top ring plate 33 may be configured so as to provide an enlarged central aperture 39 for maximizing fluid flow through valve 34 and into pump hose 20. Top plate 33 further serves as an upper stop abutting disc 38 as it actuates upwardly when the valve 34 is in the open position (as described in more detail below).

Herein, bottom plate 35 may be configured so as to sealingly receive disc 38 when valve 36 is in the closed position. In some embodiments, bottom plate 35 may form a valve seat 22, the circumference of which is at least equal to or greater than the circumference of disc 38. Seat 22 may serve as a lower stop abutting disc 38 as it actuates downwardly when valve 34 is in the closed position (as described in more detail below; FIG. 8). Seat 22 may form a plurality of seat apertures 24 providing fluid flow passageways when valve 34 is in the open position. Advantageously, seat apertures 24 may be sized and shaped so as to maximize fluid flow through valve 34 and into pump hose 20. In some embodiments, bottom plate 35 may form a depending annular groove 26 for receiving at least one annular seal (e.g. O-ring, not shown), the seal serving to prevent fluid flow between disc 38 and valve seat 22 when valve 34 is in the closed position. It is contemplated that other sizes and configurations of flow control valves are contemplated, as appropriate. Bottom plate 35 may further form centrally disposed aperture 27 for receiving injection pipe 50 (as will be described below).

Broadly, in operation, fluid pressures acting upon valve disc 38 from below (i.e. as fluids are being pumped from the body of fluids (F)), cause disc 38 to slidingly actuate upwardly along injection pipe 50 and away from valve seat 22, thereby opening the valve and allowing fluids (F) to flow upwardly around valve disc 38 and through passageways 24,39. In contrast, and having regard to FIGS. 9A and 9B, fluid pressures acting upon valve disc 38 from above cause disc 38 to slidingly actuate downwardly along injection pipe 50 until it engages with seat 22, thereby closing the valve 34 and preventing fluids (F) from flowing through passageways 24,39.

Figure 10:
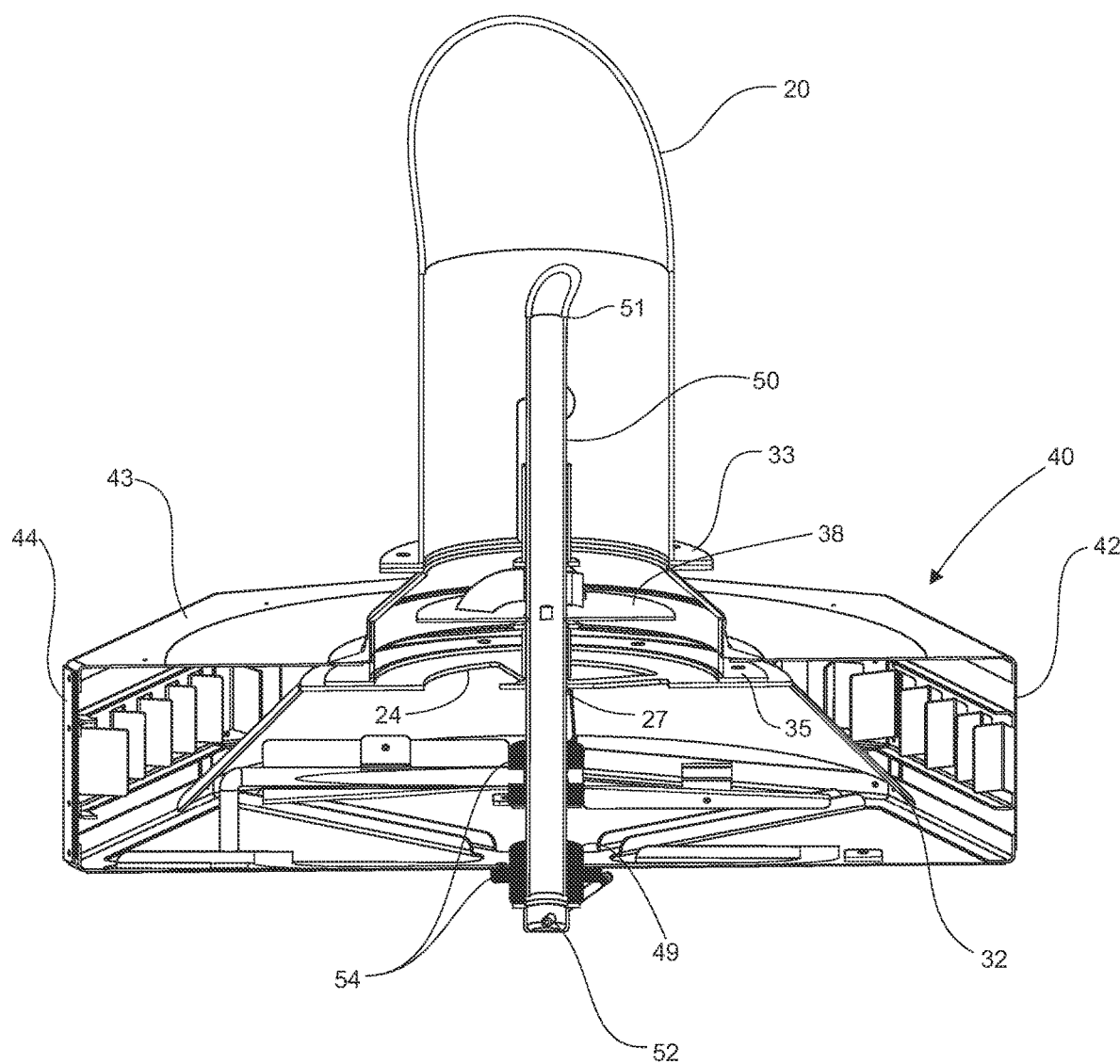
FIG. 10 is a cross-sectional side view of the apparatus showing the check valve in the open position, according to embodiments.
Figure 11:
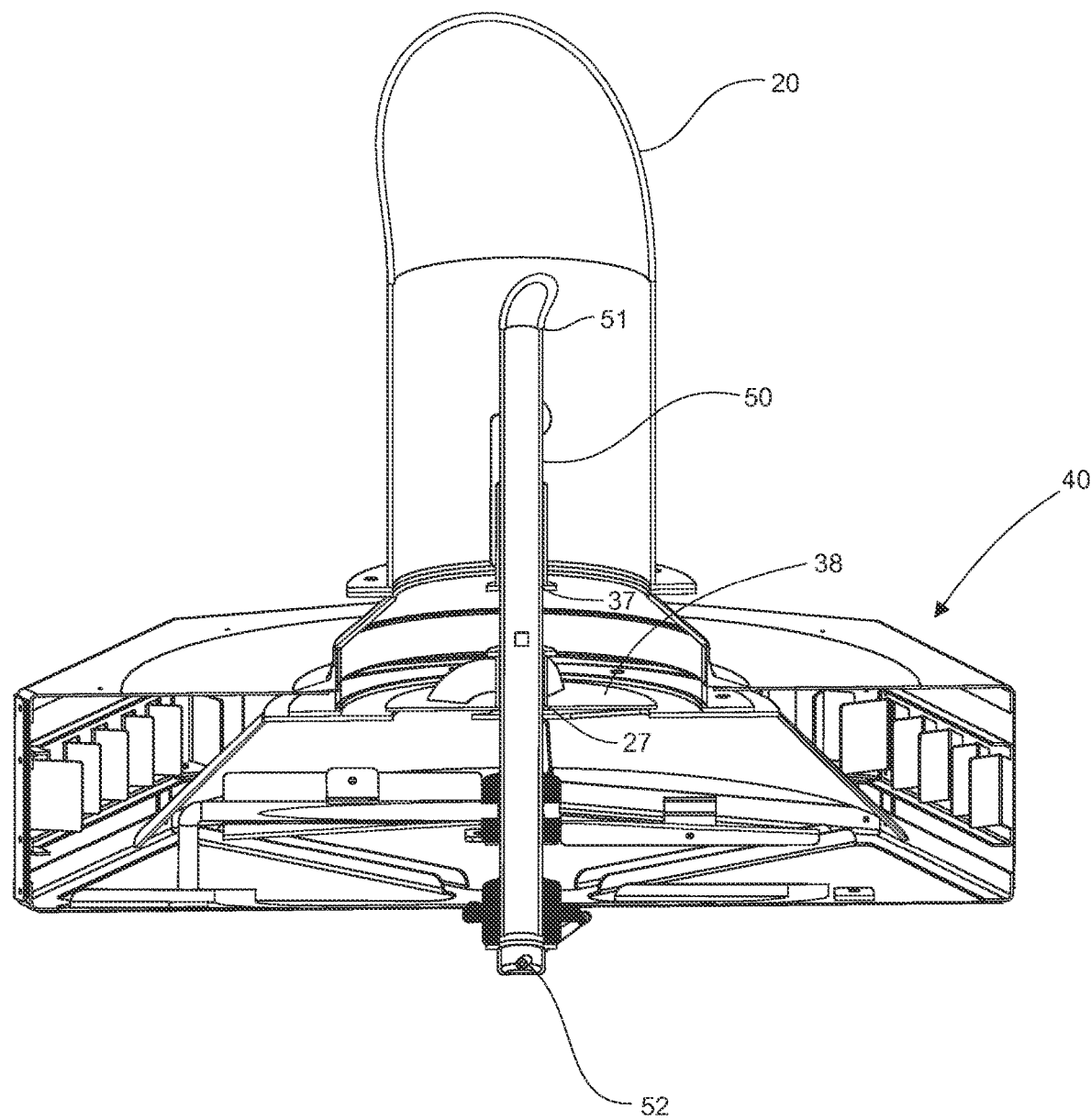
FIG. 11 is a cross-sectional side view of the apparatus showing the check valve in the closed position, according to embodiments.

Having regard to FIGS. 10 and 11, the present apparatus 10 may comprise filter cage 40, the filter cage comprising a housing 42, rotatable about a central axis, such axis being perpendicular to the rotation of housing 42. In some embodiments, housing 42 may be affixed to the apparatus 10 so as to rotate about its axis, whether rotated freely by the fluids flowing through the housing 42 (e.g. via the current of a river or other moving body of fluids), whether hydraulically by fluids injected via fluid injection pipe 50 (as will be described in more detail), or whether mechanically by a motor or otherwise-controllably rotated. Optionally, rotation of housing 42 may be assisted and/or enhanced by one or more blades 41, such as propeller blades, as will be described in more detail. It should be understood that rotation of the housing 42 can create a water wheel or turbine effect for improved pumping of the fluids into the housing 42 and towards the inlet end 32 of the pump hose 20.

In some embodiments, housing 42 may comprise a top wall 43 for preventing debris or other contaminants from entering housing 42 from above, and a sidewall 44. It is contemplated that sidewall 44 may comprise any cross-section configuration as applicable including, without limitation, a circular, hexagonal, or octagonal cross-section, or the like. In some embodiments sidewall 44 may be configured to provide a cage-like configuration for surrounding and rotating about conical inlet 32, as will be described.

Figure 12:
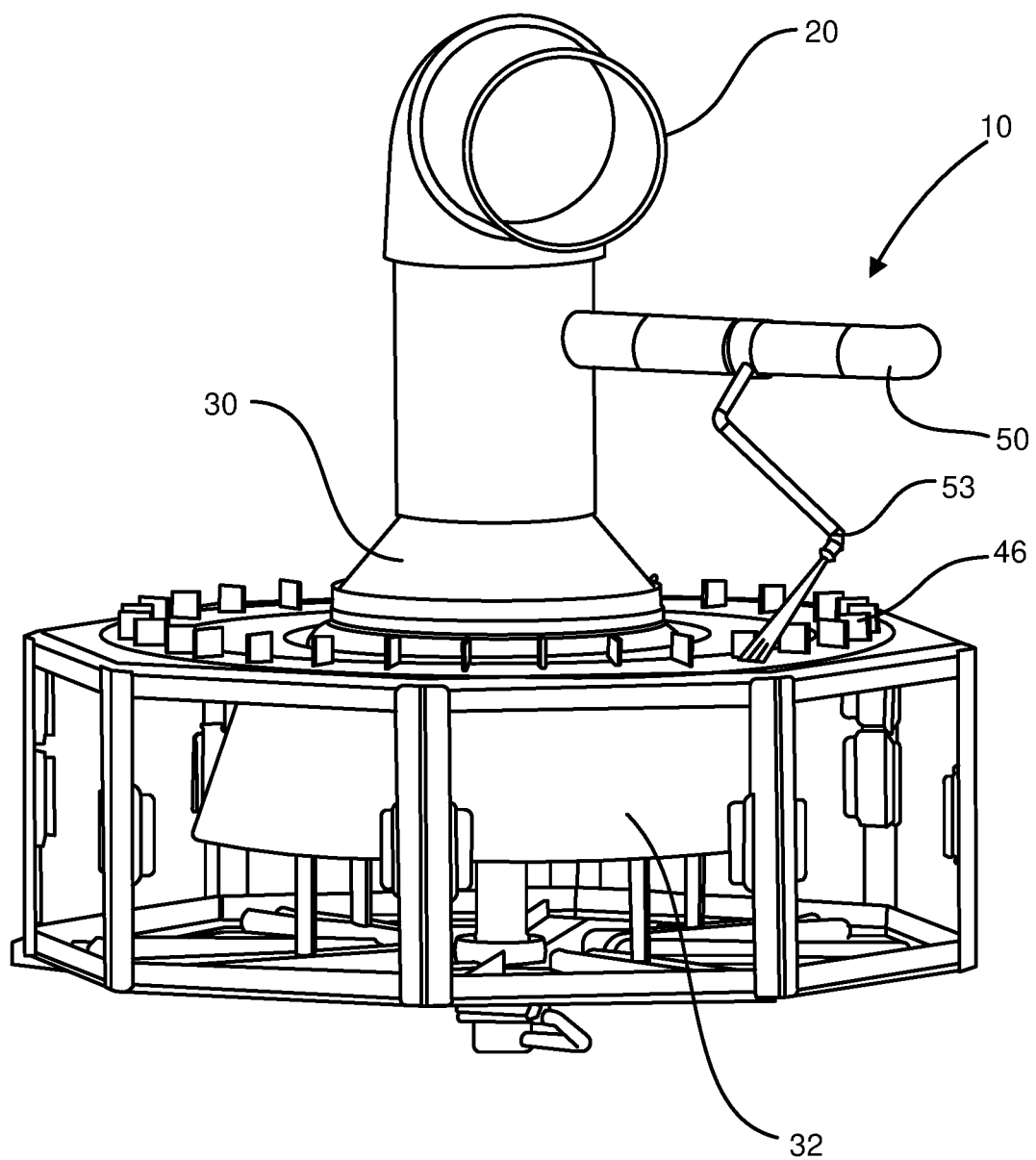
FIG. 12 is a perspective zoomed in side view of the pump intake assembly and the filter cage in isolation of an alternative embodiment of the present apparatus.
Figure 13:
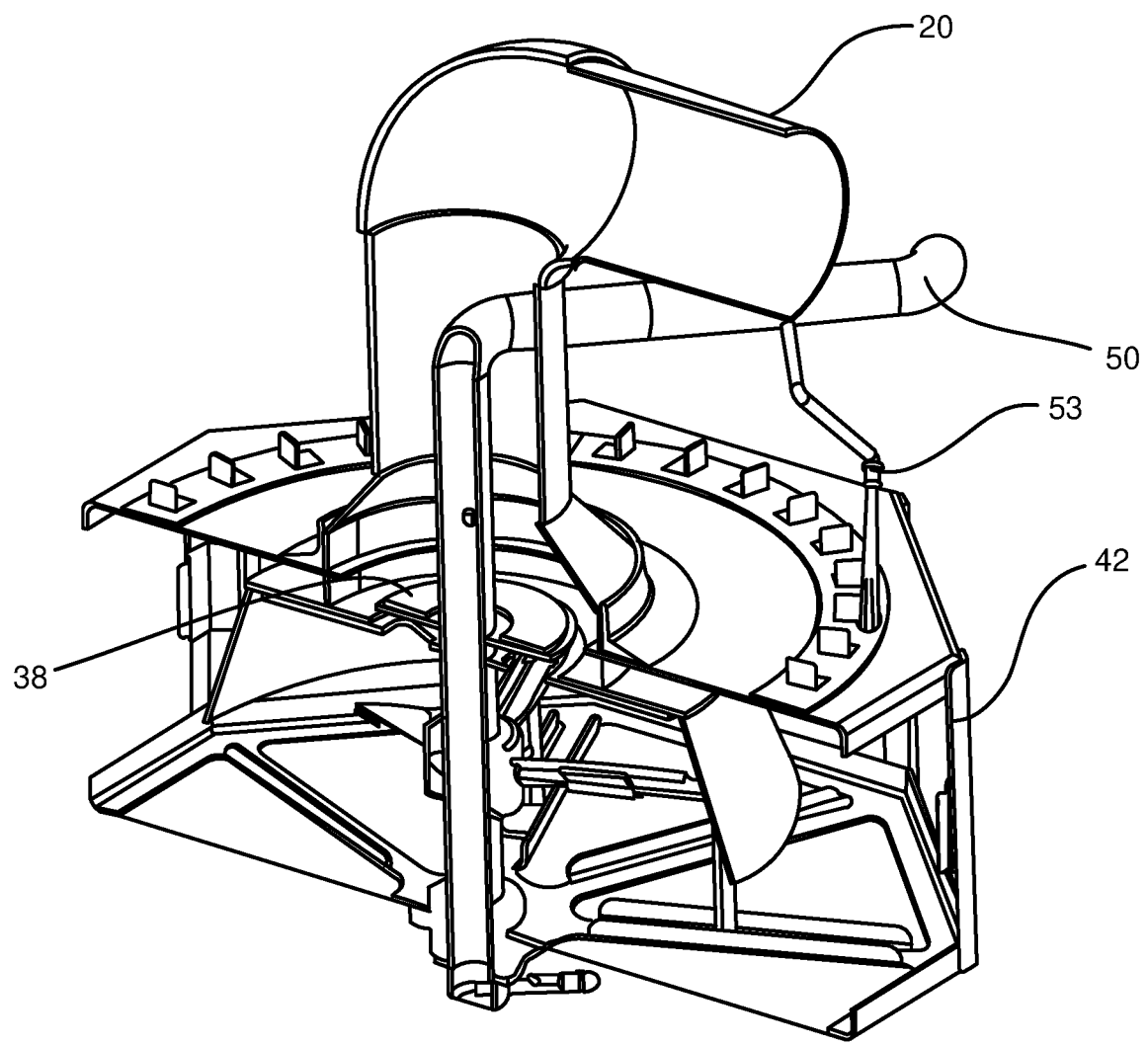
FIG. 13 is a perspective cross-sectional side view of the embodiment shown in FIG. 12.
Figure 16:
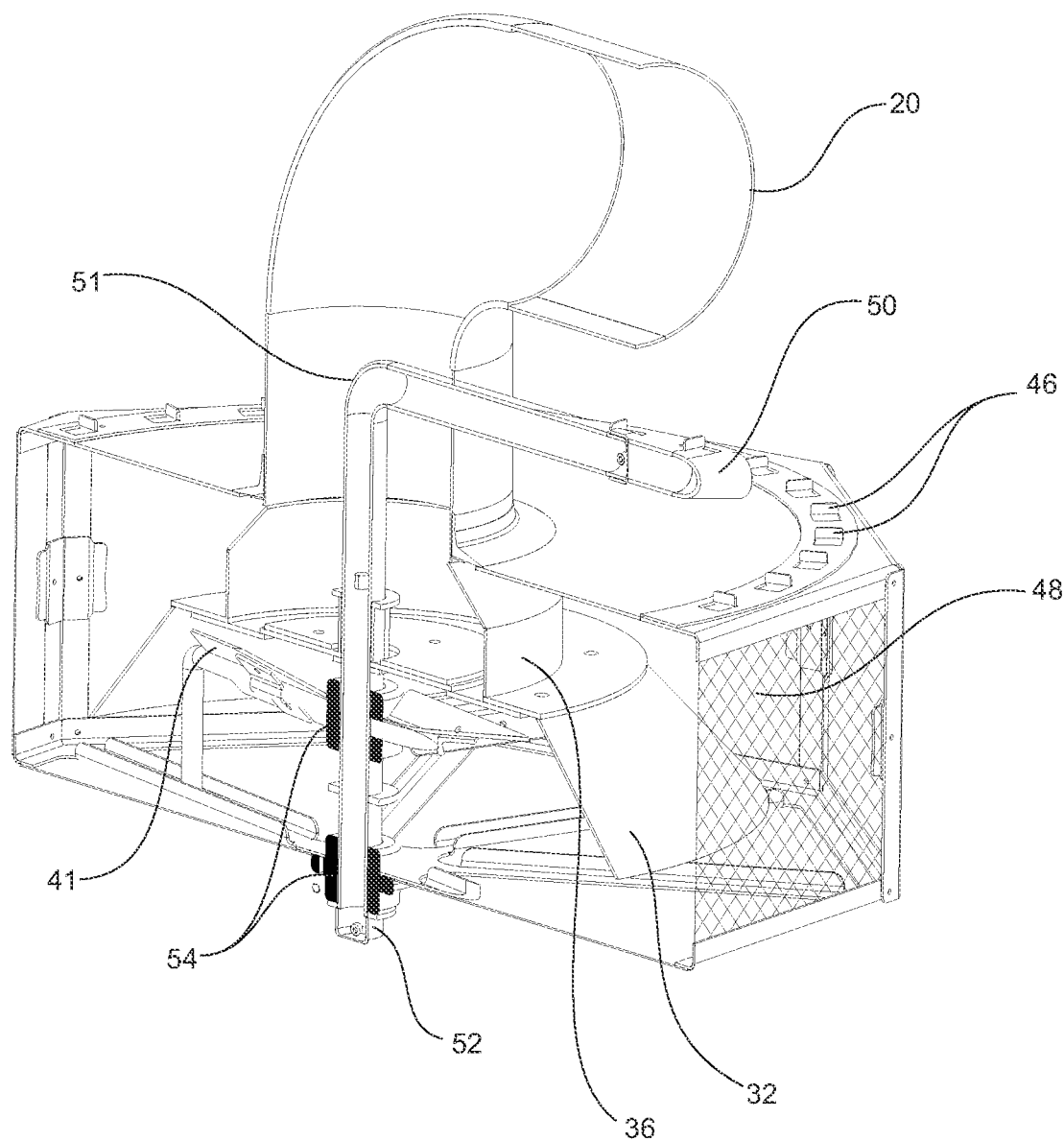
FIG. 16 is a cross-section view of the embodiment shown in FIG. 12.

Having regard to FIGS. 4, and 10-11, sidewall 44 may comprise a plurality of apertures, such that housing 42 forms a foraminous or perforated cage. In some embodiments, sidewall 44 may form a plurality of apertures 45 for allowing the passing of fluids through housing 42 as it rotates. One or more of the plurality of apertures may comprise at least one flange 46 extending inwardly therefrom, such flanges 46 acting as spin-plate(s) when forces from the fluids (F) passing through the apertures 45 act upon the flanges 46. In some embodiments, one or more additional flanges 46 may be positioned radially about top wall 43 for further enhancing rotation of housing 42 (FIGS. 12,16). It should be understood that flanges or plates 46 may be of any appropriate size, configuration and/or positioned at any angle, such size configuration and/or positioning being adjustable, so as to control and optimize the rate of rotation of housing 42. For example, it should be understood that the flanges 46 may be configured so as to increase or decrease the rate of rotation of housing 42, as desired.

According to embodiments, sidewall 44 may be configured to allow the passage of fluids (F) into housing 42 through apertures 45, while filtering or preventing debris from entering the apparatus 10. For example, having regard to FIG. 16, sidewall 44 may comprise one or more filter devices 48, such as a screen, mesh, or a series of spaced bars, or the like, for filtering leaves, branches or other undesirable debris in the body of fluids, thereby preventing the debris from entering the housing 42 via apertures 45. In some embodiments, filters 48 may be positioned at or on the exterior surface of sidewall 44, or in any manner about apertures 45 as may be appropriate, so as to filter the fluids (F) flowing through apertures 45 from debris.

Advantageously, rotation of housing 42 serves as a self-cleaning mechanism of the present apparatus 10. More specifically, rotation of the housing 42 about its axis causes debris caught on filter devices 48 of sidewall 44 to be sluffed off or to fall away from the housing 42 (i.e. the debris is carried away by the current and/or is cleaned off due the fluids passing through the housing 42 as it rotates). In some embodiments, the present apparatus 10 may serve to pumps fluids (F) from a body of fluids while at the same time filtering the fluids (F) to remove debris therefrom. Housing 42 may optionally comprise a bottom wall, such bottom wall optionally comprising cross-bars for supporting propeller as desired.

Herein, the present apparatus 10 may be specifically configured so as to allow housing 42 to rotate about its axis. According to embodiments, the present apparatus 10 may further comprise at least one fluid injection pipe 50, the pipe 50 being concentrically positioned within the pump hose 20, and centrally disposed within the pump intake assembly 30 and filter cage 40. As would be appreciated, injection pipe 50 may be positioned so as to pass through a hole in the sidewall of pump hose 20, such hole being at or near intake assembly 30. Positioning the injection pipe 50 at or near the intake assembly 30 enables the fluid pathway created within the pump hose 20 to be maximized (i.e. the injection pipe does not interfere with fluid flowing upwardly through the pump hose 20).

More specifically, having regard to FIGS. 10 and 11, injection pipe 50 may have an upper 51 and lower end 52, the upper end being concentrically positioned within the pump hose 20 (once positioned within pump 20 via at least one elbow connection) and the lower end 52 extending therefrom. At least one bearing assembly 54 may be provided so as to support rotation of cage 40 and of propeller (as will be described). In some embodiments, at least two bearing assemblies 54 are provided. Although the present apparatus 10 is configured such that cage 40 and propeller rotate simultaneously about fluid injection pipe 50, it is contemplated that the present apparatus may be configured that one or more components rotate independently from one another.

During assembly, the lower end 52 of the injection pipe 50 may be slidably received within the valve top plate 33, through aperture 37 of valve disc 38, and then through central aperture 27 of bottom plate 35 such that valve body 36 is secured to the inlet end of the pump hose 20. Moreover, valve disc 38 may be slidably received on the injection pipe 50 allowing the disc to actuate between open and closed positions, as described above. Where desired, fluids flushed through the fluid injection pipe 50 may be directed towards the inner surface of the filter cage 40, thereby serving to enhance cleaning of the filters 48 from the inside of the filter cage 40.

Figure 14:
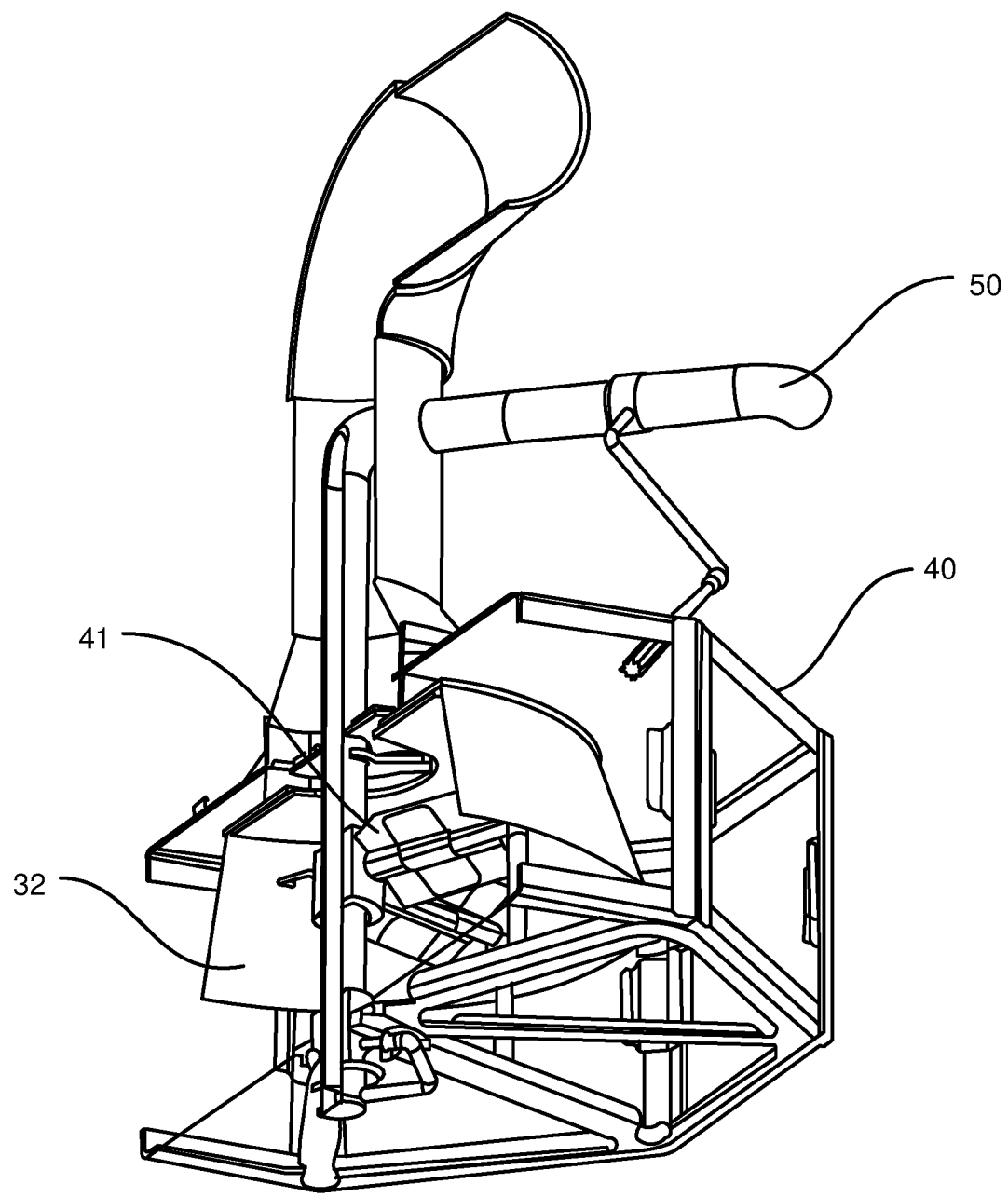
FIG. 14 is a perspective cross-sectional bottom view of the embodiment shown in FIG. 12.
Figure 15:
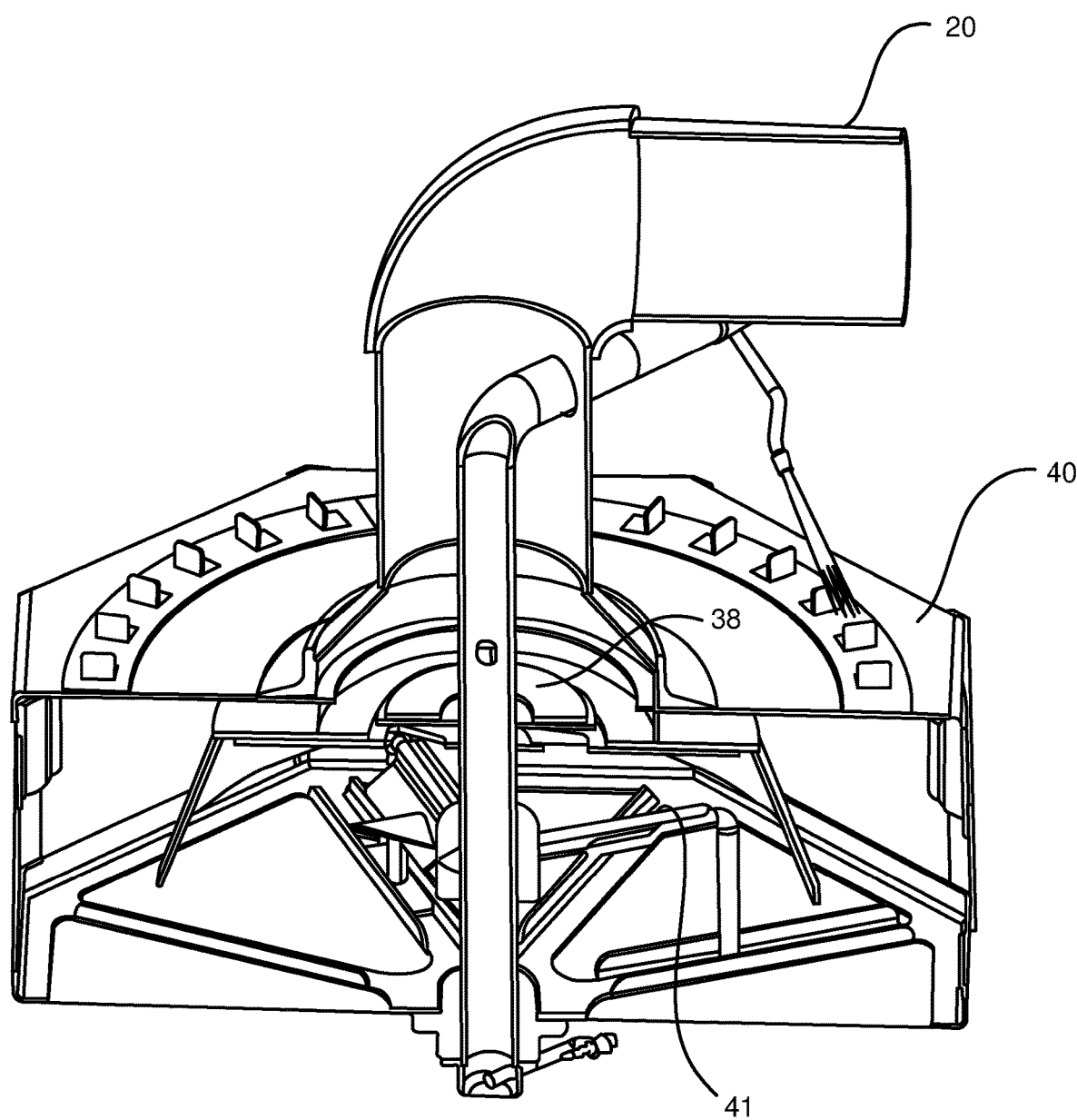
FIG. 15 is a cross-sectional view of the embodiment shown in FIG. 12.

Having regard to FIGS. 4 and 14, as above, the present apparatus 10 may comprise at least one propeller having a plurality of vanes or blades 41, positioned within the rotatable housing 42 and for assisting or driving rotation thereof. In some embodiments, blades 41 may extend radially about a central point (serving as a hub), such central point being supported by and rotatable about injection pipe 50 (via bearing assembly 54), and whereby the angle of the blades 41 may be adjustably controlled. In some embodiments, the present propeller may comprise a plurality of blades 41, and preferably at least four blades 41. Radially extending blades 41 may be mounted on a supporting propeller crossbar 47, the crossbar(s) 47 having a centrally disposed aperture 49 for rotatably receiving the lower end of injection pipe 50. Fluids (F) being drawn into the apparatus 10 via cage sidewalls 44 will act upon flanges 46 and further upon blades 41 to rotate filter cage 40. In operation, where it is desirable to increase rotation speed of housing 42, the angle of the blades 47 of the propeller relative to the fluid flow may be adjusted so as to enhance rotation. In contrast, where it is desirable to slow the rotation of housing 42, or where additional rotation means are not needed, the angle of blades 47 relative to the fluid flow may be adjusted such that the blades 47 decrease or slow rotation. That is, advantageously, where it is desirable to slow the rotation of the housing 42 (e.g. in strong currents, or to prevent turbulence), blades 47 may be adjusted so as to counter the rotation of the housing 42, slowing the rotation thereof.

According to embodiments, having regard to FIGS. 12-16, injection pipe 50 may further support at least one spray nozzle 53, such as a jet nozzle, whereby the nozzles may be positioned internally and/or externally to housing 42. The counterintuitive injection of fluids back into a body of fluids being pumped provides at least two advantages. First, fluids injected via injection pipe 50 may serve to clean the housing 42 and/or may serve to drive the rotation of the housing 42. In some embodiments, the at least one nozzle 53 may be configured internally to the housing 42 so as to direct injected fluids (e.g. pressurized water) towards the inner surface of sidewall 44 of the filter cage 40, providing means for cleaning filter devices 48 of the sidewall 44 from the inside of cage 40. Second, internally positioned nozzles 53 may further be used to direct fluids towards blades 41 and/or flanges 46, thereby controllably driving rotation of housing 42. Herein, injected fluids, such as pressurized water, may be injected into pipe 50 and through spray nozzles 53 towards sidewall 44 of cage 40 (or as otherwise may be desired). Spray nozzles 53 may be used when desired or necessary, and may provide a further optional means for removing debris from filter devices 48. In some embodiments, at least one spray nozzle 53 may be positioned externally to housing 42, further serving to direct water towards external flanges 46 on top wall 43, thereby cleaning the top portion of housing 42 while simultaneously driving rotation thereof (FIG. 12).

It is contemplated that one or more fluid injection nozzles 53 positioned internally or externally to filter cage 40 may be used to driving rotation of the housing 42, to assist with clearing debris from the housing 42, and a combination thereof. In this regard, fluid injection via fluid injection nozzles 53 may be continuously or intermittently, as desired. As would be appreciated by one skilled in the art, injection of fluids via the at least one fluid injection pipe 50 may be slowed or ceased as the fluids being pumped from the body of fluids are drained (i.e. to prevent refilling of the area being drained).

According to some embodiments, the present apparatus 10 may comprise alternative sizes and shapes where, for example, filter cage 40 may comprise a substantially circular cross-section (not shown). In other embodiments, it is contemplated that apparatus 10 may be specifically configured for elevation or rotation upwardly of at least the pump intake assembly 30 and filter cage 40, such that the apparatus 10 may be lifted from the body of fluids (F) for easy cleaning, maintenance, and servicing (e.g. eliminating the need for the entire apparatus 10 to be disassembled and/or uninstalled from the fluids).

According to embodiments, the presently improved apparatus 10 may be positioned at or near the surface of the fluids (F) being pumped, such that the flotation devices 12 buoys the apparatus 10 and controllably maintains the inlet end 15 of the pump hose 20 within the fluids being pumped. In operation, the fluids (F) are pumped into the filter cage 40, via apertures 45, causing horizontal rotation of the filter cage 40 (i.e. via forces impacting flanges 46 and blades 41). The fluids (F) are then pumped via adapted inlet end 15 of the pump hose 20 through the at least one check valve 34 into the pump hose 20 and to the surface for relocation or disposal, as desired. The adapted inlet end 15 may comprise an expanded or conical inlet 32. Where fluid pressures of the fluids being pumped are sufficient to cause the at least one check valve to actuate into the open position, fluids (F) can be pumped by the apparatus 10. Where, however, fluid pressures of the fluids being pumped are insufficient to cause the at least one check valve to actuate into the open position, the check valve can freely actuate to the closed position and fluids (F) can no longer be pumped. Closure of the check valve further prevents the backflow of fluids (F).

Rotation of the filter cage 40 provides a mechanism for self-cleaning the filters 48 as fluid continues to flow through housing 42. In order to enhance cleaning, fluids may be simultaneously flushed, via the at least one injection pipe 50, into the apparatus 10 and towards the inner surface of the filters 48, pushing debris therefrom. Where desired, the overall depth of the apparatus 10 may be increased or decreased by adjusting the floatation devices 12.

Although a few embodiments have been shown and described, it will be appreciated by those skilled in the art that various changes and modifications can be made to these embodiments without changing or departing from their scope, intent or functionality. A number of variations and modification of the invention may be accomplished without departing from the novel apparatus and methodologies disclosed herein. It would be convenient, and potentially more efficient or productive, in certain environments, to provide for some features of the invention without providing others. The terms and expressions used in the preceding specification have been used herein as terms of description and not of limitation, and there is no intention in the use of such terms and expressions of excluding equivalents of the features shown and the described portions thereof.

I claim:

1. A method for pumping fluids from a body of fluids using at least one pump for pumping the fluids, the method comprising:
    providing a fluid pumping apparatus operably connected to the at least one pump for pumping the fluids, the fluid pumping apparatus having
        a pump hose having a first intake end for receiving the pumped fluids and a second outlet end operably connected to the pump,
        a pump intake assembly, fluidically connected to the intake end of the pump hose, the pump intake assembly having at least one fluid control valve,
        a rotating filter cage, disposed about the pump intake assembly and about a central vertical operational axis of the pump hose, and
        at least one fluid injection pipe centrally disposed within the pump hose for supporting the at least one fluid control valve, and for injecting fluids to drive the rotation of the rotatable filter cage,
    positioning the at least one fluid pumping apparatus at or near the surface of the body of fluids,
    pumping fluids from the body of fluids into the fluid pumping apparatus via the rotating filter cage and into the pump hose, and
    simultaneously injecting fluids via the at least one fluid injection pipe to drive rotation of the filter cage.

2. The method of claim 1, wherein the method further comprises controlling fluid pressures of the fluids being pumped into the fluid pumping apparatus by maintaining sufficient fluid pressures to cause the at least one fluid control valve to actuate to the first open position.

3. The method of claim 1, wherein the method further comprises preventing backflow of fluids by reducing fluid pressures of the fluids being pumped into the fluid pumping apparatus to cause the at least one fluid control valve to actuate to the second closed position.

4. The method of claim 1, wherein the method comprises providing a conical inlet end of the pump hose for increasing the fluid velocity of the fluids being pumped.

5. The method of claim 1, wherein the method further comprises providing flotation devices operably connected to the pumping apparatus and adjusting the flotation devices to increase or decrease the depth of the fluid pumping apparatus in the body of fluids.

6. The method of claim 1, wherein the injection of fluids via the at least one fluid injection pipe may be enhanced by one or more jet nozzles.

7. The method of claim 1, wherein the method further comprises injecting fluids via the at least one fluid injection pipe to clean debris collecting about the rotating filter cage.

8. The method of claim 1, wherein the method further comprises providing at least one propeller for controlling the speed of rotation of the rotating filter cage.

9. The method of claim 1, wherein the body of fluids is a river, a lake, a pond, or other low-lying body of fluid.

* * * * *